United States Patent [19]
Jordan

[11] Patent Number: 6,094,528
[45] Date of Patent: Jul. 25, 2000

[54] METHOD AND APPARATUS FOR SYSTEM BUILDING WITH A TRANSACTIONAL INTERPRETER

[75] Inventor: Michael J. Jordan, Palo Alto, Calif.

[73] Assignee: Sun Microsystems, Inc., Palo Alto, Calif.

[21] Appl. No.: 08/738,972

[22] Filed: Oct. 24, 1996

[51] Int. Cl.⁷ ........................................... G06F 9/45
[52] U.S. Cl. .................................................. 395/704
[58] Field of Search ................................... 395/704, 181, 395/182.13, 182.14, 182.15, 183.01, 182.02

[56] References Cited

U.S. PATENT DOCUMENTS

| | | | |
|---|---|---|---|
| 4,488,228 | 12/1984 | Crudele et al. | 395/182.19 |
| 4,493,035 | 1/1985 | MacGregor et al. | 395/182.19 |
| 4,524,415 | 6/1985 | Mills, Jr. et al. | 395/182.19 |
| 4,674,038 | 6/1987 | Brelsford et al. | 395/182.13 |
| 5,274,813 | 12/1993 | Itoh et al. | 395/704 |
| 5,524,241 | 6/1996 | Ghoneimy et al. | 707/10 |
| 5,644,742 | 7/1997 | Shen et al. | 395/591 |
| 5,701,480 | 12/1997 | Raz | 395/671 |
| 5,740,441 | 4/1998 | Yellin et al. | 395/704 |
| 5,754,839 | 5/1998 | Pardo et al. | 395/568 |
| 5,799,157 | 8/1998 | Escallon | 395/227 |

FOREIGN PATENT DOCUMENTS

WO9500901  1/1995  WIPO .

OTHER PUBLICATIONS

Yi–Min Yang et al. "Checkpointing and Applications," 25th International Symposium on Fault Tolerant Computing Digest of Papers, Pasadena, Jun. 27–30, 1995, IEEE pp. 22–31 XP000597774.

*Primary Examiner*—Tariq R. Hafiz
*Assistant Examiner*—Wei Zhen
*Attorney, Agent, or Firm*—The Hecker Law Group

[57] ABSTRACT

A method and apparatus for system building with a transactional interpreter. Unlike interpreters of the prior art, a transactional interpreter permits large interpreter-based operations, such as a system build, to resume processing from a point within the operation, i.e., the most recently completed transaction, rather than restarting from the beginning when the operation is interrupted. Control over transaction processing is maintained at the virtual machine level by the interpreter, and is therefore transparent with respect to the user of the interpreting software. In one embodiment of the invention, a virtual machine comprises a computer system running a transactional interpreter process with an underlying database such as an object-oriented database. The transactional interpreter individually processes instructions from an input stack, and, between the processing of each instruction, determines whether a commit operation is to be performed, marking the end of a transaction. The length of a transaction can be defined in terms of a predetermined number of instructions, a predetermined time interval, or a combination of instructions and time interval. When a commit operation is performed, state information for the virtual machine, such as the contents of virtual machine registers, is written to persistent storage in the underlying database. Sufficient state information is maintained in persistent storage to return the virtual machine to the state of the last completed transaction in the event of an interruption in the interpreting process. Forward progress in the interpreting process is therefore maintained.

30 Claims, 7 Drawing Sheets

METHOD AND APPARATUS FOR SYSTEM BUILDING WITH A TRANSACTIONAL INTERPRETER

BACKGROUND OF THE INVENTION

1. Field of the Invention

This invention relates to the field of software system building, and, more specifically, to system building using an interpreter.

2. Background

Often in the development of a large application, the construction of software code for implementing the application is divided into separate code construction efforts centered around individual code objects or components having their own algorithms and data. System building is applied to form the separate code components into the finished software object or objects, referred to as "derived objects," which embody the application.

In the prior art, the construction, or "building," of a software application or system, i.e., the reduction of coded objects or components and their respective linking rules into libraries, executable source code, or other derived objects, is performed in a single complicated, pass-fail build operation. Either the system is completely compiled during the build operation, or the build operation must be restarted from the beginning. No safe mechanism exists that allows for an interrupted build operation to proceed from any point within the operation other than the beginning.

System Building

The construction of derived objects, such as program executables, referred to as "building," entails the combination of a set of input objects and a set of rules that describe how to manipulate the input objects to produce the derived objects. These rules may consist of scripted instructions for linking objects, constructing interfaces and establishing system inputs otherwise not provided by the objects. The construction of the scripted rules may be generated in a text file by a developer using a text editor to generate the rules in a scripting language readable by a system builder process. Also, the rules may be generated as an intermediate output file from a system development tool.

Some system development tools provide graphic user interfaces (GUIs) for the developer to identify objects from a library for use in the system and to graphically represent the desired object links, interfaces, and inputs for a selected set of identified input objects. The system development tool composes an intermediate output file representing the necessary rules, e.g., in a script format, for supporting the system that was defined by the developer using the tool's GUI. The format of the script is designed to be interpreted by the system builder process to facilitate construction of the desired derived objects.

The scripted rules are provided as input to the system builder process which constructs the system, e.g., by compiling the object code for the specified input objects and linking the code in the appropriate manner. The system is evaluated by the system builder process, and derived objects are generated as output. The derived objects are usually provided in the form of an executable file, though intermediate representations of the derived objects are also possible.

Two examples of building environments are the "make" system provided in the UNIX environment, and the "Vesta" system developed by the Systems Research Center of Digital Equipment Corporation. The "make" system is designed with mutable objects in mind, relying on a dependency structure. However, the "Vesta" system is designed for attaining repeatability (i.e., each build is the same as every other build for a given set of input objects). In Vesta, repeatability is achieved using immutable objects. Immutable objects are not susceptible to changes. However, mutable objects are prone to changes such as modifications to code or data within the object. Typically, modified objects can be identified from the change in the modification date assigned to the file that contains the modified code or data.

In the "make" system, a developer creates a "makefile" which describes the software system in terms of the source and object modules that go into the system. Dependencies for each activity in the "makefile" are explicitly listed, such that when a first object is dependent on a second object and the second object has changed, the first object is rebuilt. This enables changes, such as module version updates, to propagate between objects. However, "make" relies on file dates to determine what to rebuild. Whether or not an object is rebuilt depends upon the time stamps for the object and its constituents. This approach is sufficient only if progress is made along the timeline in a positive direction. If an earlier version of a first object is determined to be superior to a later version of the same object, and the earlier version is reinstated in the later version's place, the timestamp of the first object will reflect the file date of the earlier version. "Make" will not rebuild any objects dependent on the first object because the time stamp of the first object predates the timestamp of the dependent object. Further, the "make" system does not provide repeatability. Because objects are permitted to change, successive builds can yield differing results.

The Vesta system uses an input "model file" similar to a "makefile." However, the Vesta system does not use the same dependency format. Vesta guarantees repeatability in system building by using immutable objects. The input objects for a particular system build are not permitted to change, and since the system build has no other external inputs, repeatability is achieved. The immutability of the input objects is maintained by placing the input objects in a project area in long term storage assigned to a specific system build operation. No objects within the project area are permitted to be modified. Updated copies of input objects are placed in a new project area, and are considered to be a part of a different system build operation.

Both the "make" system and the Vesta system use pass-fail build operations wherein an interruption of the system build necessitates rebuilding from the beginning. The Vesta system implements a caching system to recover some utility from previous builds. In the caching system, certain operations in the evaluation of the input "model file" are stored in the Vesta cache. When the same operation is called for in a subsequent build, Vesta searches the cache for the same operation and uses the cached evaluation parameters rather than recomputing the operation. Thus, evaluation of the "model file" may experience a speed increase for some operations that were previously evaluated. However, implementation of the caching function can result in a speed reduction for all operations as the cache is queried. Further, rebuilding or re-evaluation must still proceed through the "model file" from the beginning.

FIG. 1 is a flow diagram of a general system building process. In step 100, the developer determines which objects will be used as input objects for the system. These objects may comprise standard objects provided from a third party, objects the developer has constructed himself, or objects provided by a third party and subsequently modified by the developer to meet his needs. Once the set of input objects is determined, in step 101, an object configuration file is constructed to define how the system is to be built from the selected set of input objects. The object configuration file contains references to the input objects, and typically specifies the steps to be taken to compile the input objects and link them together in the desired manner to generate the desired derived object or objects. As earlier described, the object configuration file is typically a high level script file generated with a text editor or with a specialized system development GUI application.

In step 102, the object configuration file is provided as input to a system builder application which evaluates the object configuration file and performs the scripted operations to generate the derived objects. For large systems having many input objects, the system builder application may have many time-consuming tasks to perform. For instance, the system builder application compiles each input object individually, e.g., by making a call to a separate compiler process and waiting for the compiler to return a completion indication. Therefore, the building operation of step 102 can take several hours or more to complete.

In step 103, a branching occurs based on whether the building operation of step 102 finishes in its entirety, or whether the building operation is halted some time prior to completion. If the build operation halts before completion, e.g., due to a system crash, an error in the object configuration file, etc., then the build operation of step 102 must be restarted from the beginning. If the build operation completes successfully, then the generated derived objects are implemented in step 104.

FIG. 2 is a general block diagram of a system building process. Standard objects 200 and user objects 201 are shown as inputs into system development tool 205. The output of system development tool is object configuration file 202, which comprises references to the input objects and rules for linking the input objects together, herein represented by block 203. Object configuration file 202 is provided to system builder 206 for evaluation. Derived objects 207, which may comprise one or several derived objects, are generated by system builder 206 during the evaluation process. System development tool 205 and system builder 206 are components of system building tools 204.

Standard objects 200 comprise objects provided by a third party and selected as input objects for the building operation. These objects include standard code components such as "C" code standard libraries and other general code components used to support the user objects 201. User objects 201 are input objects which the developer may have coded himself, or which the developer may have received from another source and optimized for use in the system. The input objects represented by standard objects 200 and user objects 201 are the building blocks of the desired system. In the Vesta system, these input objects are typically kept in a designated project directory in long term storage to maintain their immutability. I.e., the input objects are set aside in long term storage to prevent unintentional modification of the object files.

Once the developer has in mind which objects are to be input objects for the system, the developer uses system development tool 205 to generate the rules or steps for building the system. As described above, system development tool 205 may be a GUI tool for selecting objects (e.g., by file name) and assigning links, or system development tool 205 may be a standard text editor wherein the developer generates a text file containing the scripted rules for building the system. The scripted rules generated by the system development tool are stored as object configuration file 202, which often has the appearance of a high-level language program.

For example, in the Vesta system, a fragment of an object configuration file, or "model file," has the following format:

```
DIRECTORY
    Main.mod = /vesta/project.a/object.1,
    Subs.mod = /vesta/project.a/object.2,
IN  {
    build = FUNCTION Prog, Compile IN
        Prog( (Compile(Main.mod), Compile(Subs.mod)) );
        .
        .
        etc.
    }
```

In the above Vesta model file, the "directory" portion of the fragment serves to provide unique identifiers for the input objects, "object.1" and "object.2" (e.g., with a reference to their directory location, i.e., within subdirectory "project.a" in the main "vesta" directory), and to bind the names, "Main.mod" and "Subs.mod," respectively, to the input object identifiers. The "Compile" and "Prog" functions are used to invoke a compiler and linker, respectively. When evaluated, the compound build statement effectively invokes the compiler twice, combines the results in a two-element list, and passes the list to the linker.

The Vesta "model file" format is recognizable as similar to that of a program written in a high-level language. The actual format of the object configuration file typically depends on the format expected by the particular system builder responsible for evaluating it. An actual object configuration file may comprise many statements and functions, and may be used to generate system executables, manual "MAN" pages, and other derived objects in the same build operation.

System builder 206 of FIG. 2 evaluates object configuration file 202, carrying out the instructions specified in file 202 to generate derived objects 207. In addition to evaluating file 202 to build the derived objects, the system builder may also apply type checking, debugging, and optimizing functions during the evaluation to identify improper build instructions in the object configuration file or to optimize generation of the derived objects.

Software Interpreters

Evaluation of the object configuration file is sometimes performed via an interpreter. An interpreter is a software mechanism that is used to execute a high-level program. The interpreter reads a high-level input program, in this case, the object configuration file, and causes the computer system to carry out operations consistent with those called for in the input program. In some instances, such as when a bytecode interpreter is used, the high-level input program is precompiled into bytecodes for evaluation by the interpreter. The interpreter typically runs on top of the operating system, but may also be designed to execute without an underlying operating system.

FIG. 3 is a block diagram of a computer system having an interpreter-based system builder. The foundation of the system is the computer machine hardware 303 comprising random access memory and a central processing unit having an architecture supporting a particular microcode instruction set. Operating system 302 resides in memory and is run by the central processing unit in machine hardware 303. Operating system 302 provides system-level support such as control over I/O functions, multi-processing, etc., and provides an environment for application-level programs.

Interpreter 301 and compilers/linkers 304 are software processes running on top of operating system 302. Object configuration file 202 is an input file to interpreter 301. Pursuant to the instructions within input file 202, the interpreter may perform some operation on the input object files 300, including directing the compilers/linkers 304 to compile and/or link specific input object files in a prescribed manner. The compiled and linked output file or files are stored in long term storage as derived objects 207.

A typical hardware machine, such as that represented by machine hardware 303, has a stack of microinstructions for carrying out a process, be it an application program or part of the operating system. The microinstructions designate particular operations to be performed on the contents of registers within the machine, such as "add the contents of registers A and B, and store the result in register A," or "load the contents at memory address X into register A." A register referred to as the "PC register" maintains a pointer to the next microinstruction in the stack. When a microinstruction has been carried out, the machine advances to the next microinstruction indicated by the PC register. The complexity of the individual microinstructions are determined by the specific microinstruction set supported by the machine architecture.

Interpreter 301 is designed to emulate the operation of a machine in its evaluation of input instructions. For this reason, the interpreter is sometimes referred to as a "virtual machine." The virtual machine provides a level of abstraction from the real machine carrying out the low level operations, i.e., hardware machine 303. Whereas the microinstruction set of machine 303 is fixed, the complexity of the input instruction set for the virtual machine is substantially arbitrary, so long as each instruction in the input instruction set of the virtual machine is realizable by some combination of microinstructions from hardware machine 303.

For example, the functions available to a standard microprocessor are often determined by an internal arithmetic logic unit (ALU) which may provide such register-level operations as simple addition, subtraction, bit-shifting, etc. Similarly, a virtual machine such as that provided by components 301–304 in FIG. 3, could provide higher level instructions such as "compile file A and store result as file B," or "link file A and file B, and store result as file C." In this example, files A, B and C comprise virtual structures similar to the registers of a real machine. The higher level instructions provided by the virtual machine are supported by software methods within the interpreter process and by linked processes, such as compilers/linkers 304, programmed to perform higher level operations. Different compiler processes may be provided for compiling objects in different computer languages.

Using an interpreter to evaluate an input program can be much slower than execution of a program that has been compiled into hardware machine readable code. This is due to the cost inherent in the emulation of a virtual machine. It would therefore be advantageous to be able to preserve the work performed by an interpreter in the event that the interpreter is interrupted. The time and resource consuming act of re-evaluating operations in an input file would be obviated. However, in general, no mechanism exists for preserving the forward progress of an interpreter.

SUMMARY OF THE INVENTION

A method and apparatus for system building with a transactional interpreter is described. Unlike interpreters of the prior art, a transactional interpreter permits large interpreter-based operations, such as a system build, to resume processing from a point within the operation, i.e., the most recently completed transaction, rather than restarting from the beginning when the operation is interrupted. Control over transaction processing is maintained at the virtual machine level by the interpreter, and is therefore transparent with respect to the user of the interpreting software.

In one embodiment of the invention, a virtual machine comprises a computer system running a transactional interpreter process with an underlying database such as an object-oriented database. The transactional interpreter individually processes instructions from an input stack, and, between the processing of each instruction, determines whether a commit operation is to be performed, marking the end of a transaction. The length of a transaction is defined in terms of a predetermined number of instructions, a predetermined time interval, or a combination of instructions and time interval. When a commit operation is performed, state information for the virtual machine, such as the contents of virtual machine registers, is written to persistent storage in the underlying database. Sufficient state information is maintained in persistent storage to return the virtual machine to the state of the last completed transaction in the event of an interruption in the interpreting process. Forward progress in the interpreting process is therefore maintained.

DETAILED DESCRIPTION OF THE INVENTION

A method and apparatus for system building with a transactional interpreter is described. In the following description, numerous specific details are set forth in detail to provide a more thorough description of the invention. It will be apparent, however, to one skilled in the art, that this invention can be practiced without these specific details. In other instances, well known features have not been described in detail so as not to unnecessarily obscure the invention.

In the prior art, no mechanism is provided for preserving progress made during a system build operation. In the prior art, if the build is disrupted for any reason, then it must be restarted from the beginning. The caching method of the Vesta system provides some ability to speed up the re-evaluation of an object configuration file, but the build is still processed from the beginning.

In an embodiment of the invention, evaluation of an object configuration file is partitioned at the virtual machine level into a plurality of transactions. At the end of each transaction, the state of the virtual machine is committed to persistent storage in a database. If the evaluation is interrupted for any reason, the evaluation is restarted from the last successful transaction by setting the state of the virtual machine to the last stored value. Therefore, no previously performed evaluation operations up to the point of the last transaction need be repeated. The input objects are held immutable to provide repeatability, and to guarantee that no changes are made to the input objects between the disruption and resumption of a system build.

A tradeoff exists between the robustness of the system and the time delay added by the committing process. More frequent transaction breakpoints mean that fewer evaluation operations are lost if the process is restarted from the last transaction. However, each transaction commit cycle adds a time delay while the state of the virtual machine is written to the underlying database. The interpreter operates in a "fetch next instruction/execute instruction" cycle, permitting the commit decision to be made at a central control point in the interpreter software code. The software is therefore easily modified to provide optimal transaction partitioning.

Figure 1:
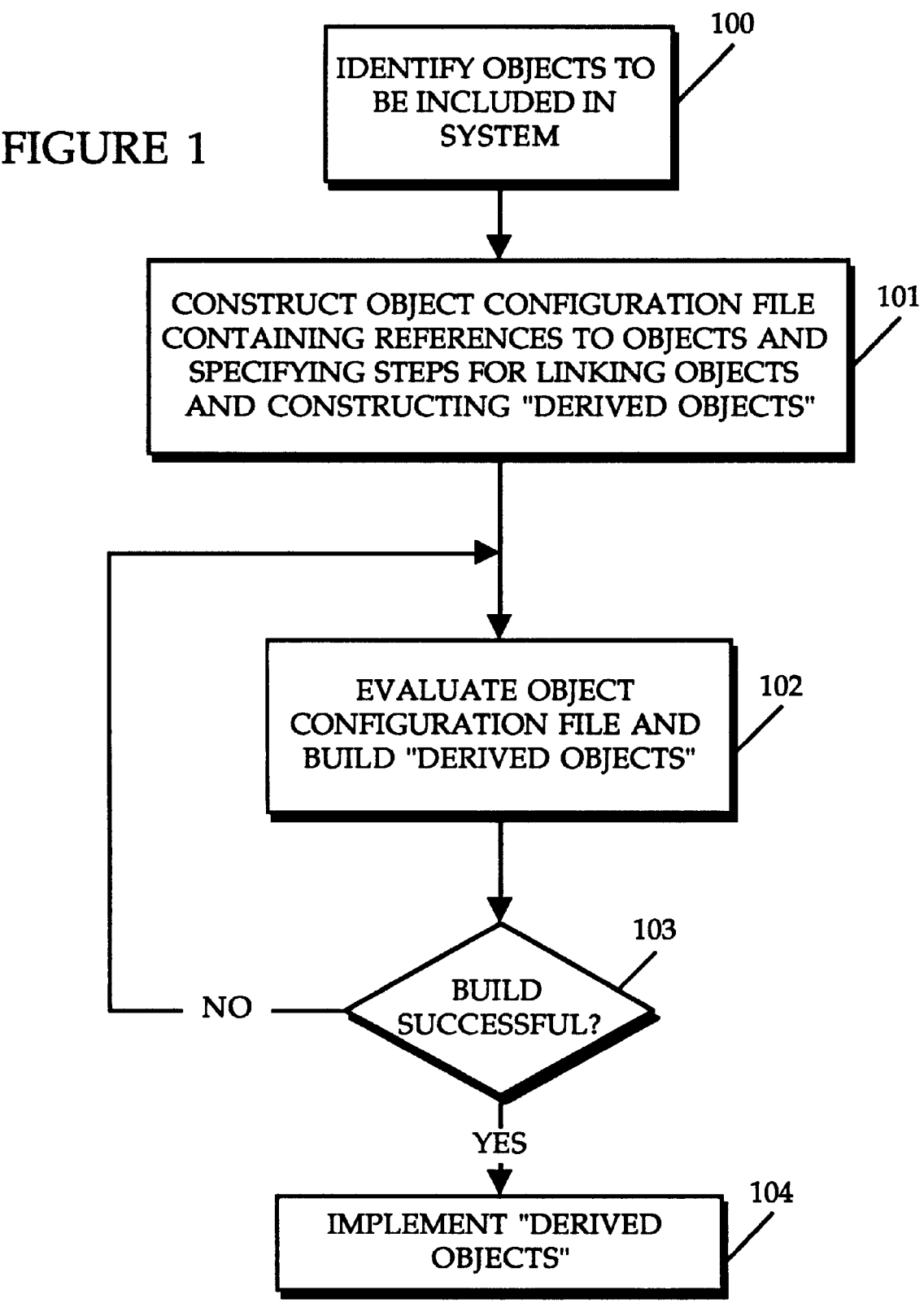
FIG. 1 is a flow diagram of a general system building process.
Figure 2:
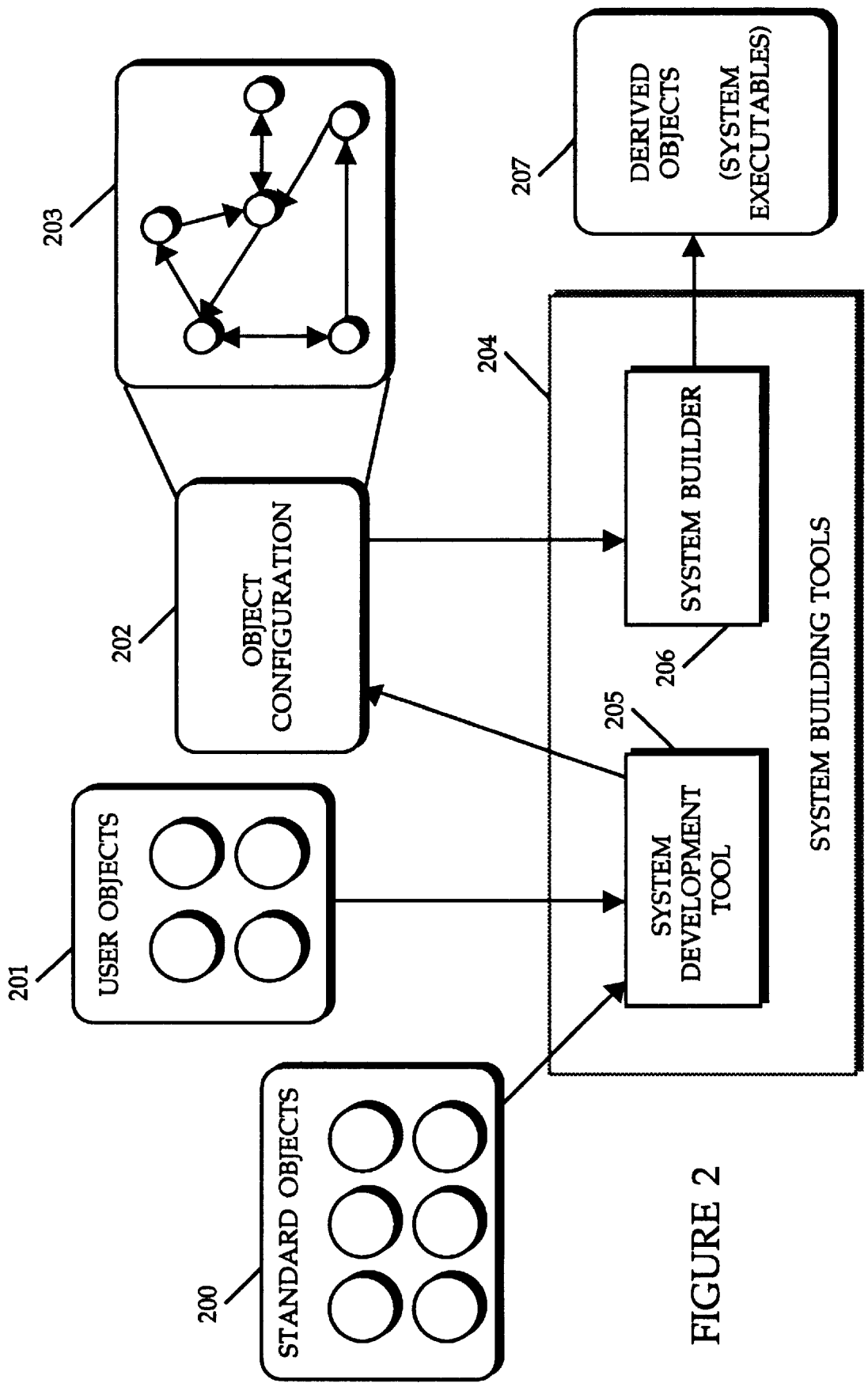
FIG. 2 is a general block diagram of a system building process.
Figure 3:
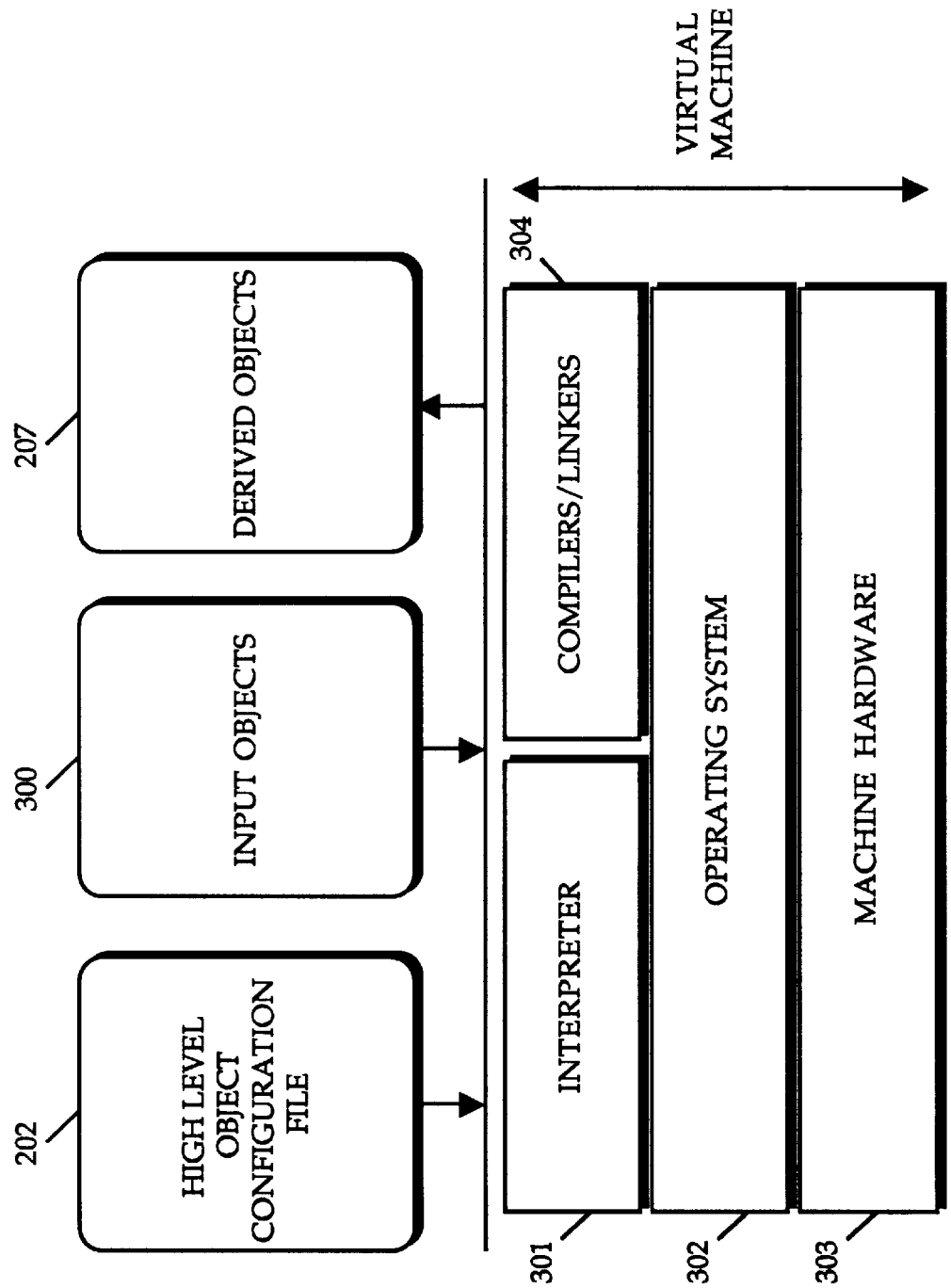
FIG. 3 is a block diagram of a computer system having an interpreter-based system builder.
Figure 4:
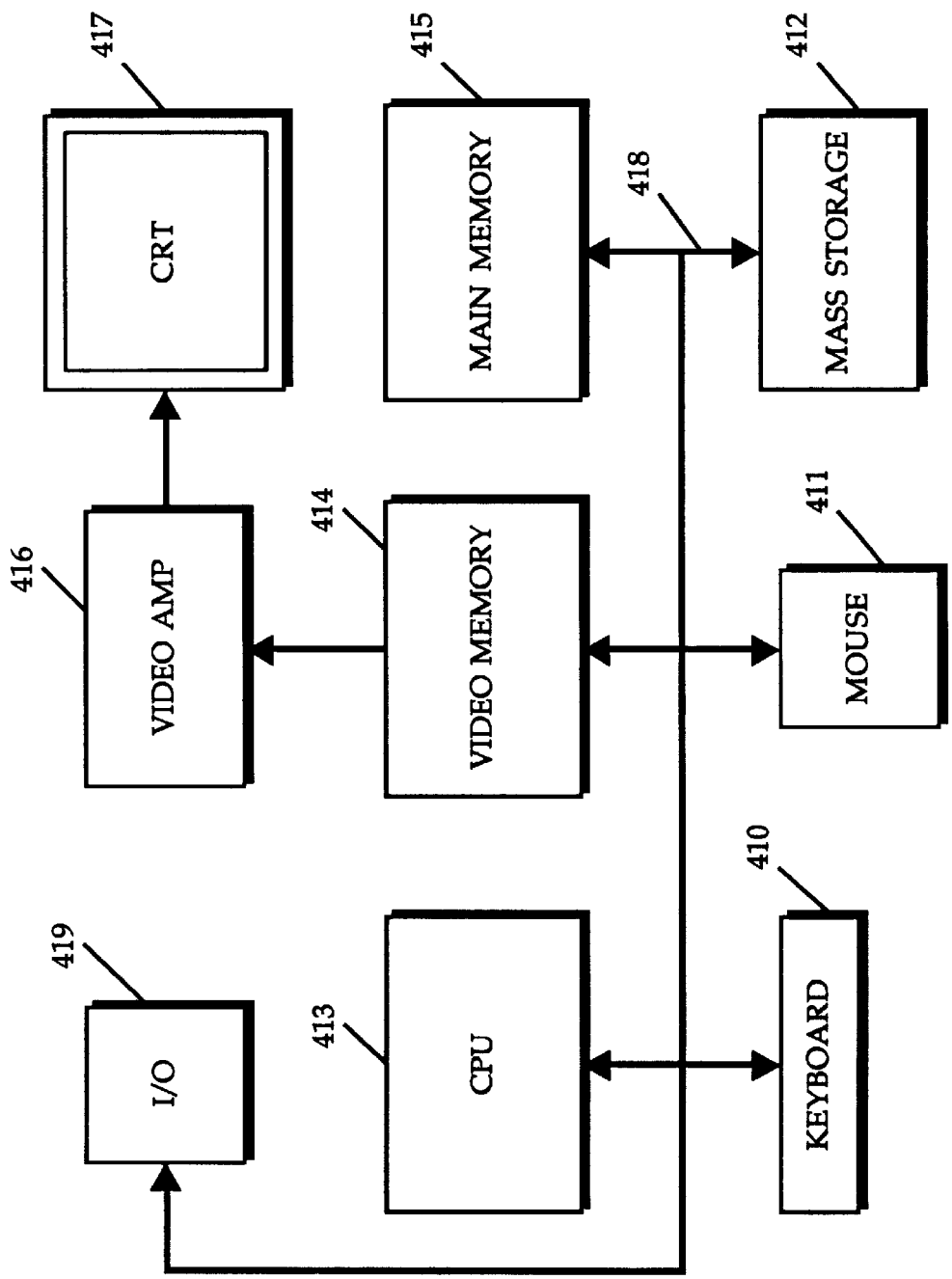
FIG. 4 is a block diagram of a general hardware computer system suitable for implementing an embodiment of the invention.

An embodiment of the invention can be implemented as computer software in the form of computer readable program code executed on a general purpose computer such as illustrated in FIG. 4. A keyboard 410 and mouse 411 are coupled to a bi-directional system bus 418. The keyboard and mouse are for introducing user input to the computer system and communicating that user input to central processing unit (CPU) 413. Other suitable input devices may be used in addition to, or in place of, the mouse 411 and keyboard 410. I/O (input/output) unit 419 coupled to bi-directional system bus 418 represents such I/O elements as a printer, network communications card, modem, A/V (audio/video) I/O, etc.

The computer system of FIG. 4 also includes a video memory 414, main memory 415 and mass storage 412, all coupled to bi-directional system bus 418 along with keyboard 410, mouse 411 and CPU 413. The mass storage 412 may include both fixed and removable media, such as magnetic, optical or magnetic optical storage systems or any other available mass storage technology. Bus 418 may contain, for example, thirty-two address lines for addressing video memory 414 or main memory 415. The system bus 418 also includes, for example, a 32-bit data bus for transferring data between and among the components, such as CPU 413, main memory 415, video memory 414 and mass storage 412. Alternatively, multiplex data/address lines may be used instead of separate data and address lines.

In one embodiment of the invention, the CPU 413 is a microprocessor manufactured by Motorola, such as the 680x0 processor or a microprocessor manufactured by Intel, such as the 80x86, or Pentium processor, or a SPARC microprocessor from Sun Microsystems. However, any other suitable microprocessor or microcomputer may be utilized. Main memory 415 is comprised of dynamic random access memory (DRAM). Video memory 414 is a dual-ported video random access memory. One port of the video memory 414 is coupled to video amplifier 416. The video amplifier 416 is used to drive the cathode ray tube (CRT) raster monitor 417. Video amplifier 416 is well known in the art and may be implemented by any suitable apparatus. This circuitry converts pixel data stored in video memory 414 to a raster signal suitable for use by monitor 417. Monitor 417 is a type of monitor suitable for displaying graphic images.

The computer systems described above are for purposes of example only. An embodiment of the invention may be implemented in any type of computer system or programming or processing environment.

In one embodiment of the invention, the system builder comprises a virtual machine with an interpreter process running with an underlying database. The concept of transactional interpreting is applicable to all interpreters. However, description is provided herein with respect to a bytecode interpreter, such as that provided in the JAVA™ runtime system. Similarly, many types of databases may be used to store the state of the virtual machine, however, description is provided herein with respect to an object-oriented database. Other mechanisms such as a file system can also be used to store the state of the virtual machine, though the facilities of an object-oriented database are better adapted to the fine-grained structures used by a transactional interpreter.

Figure 5:
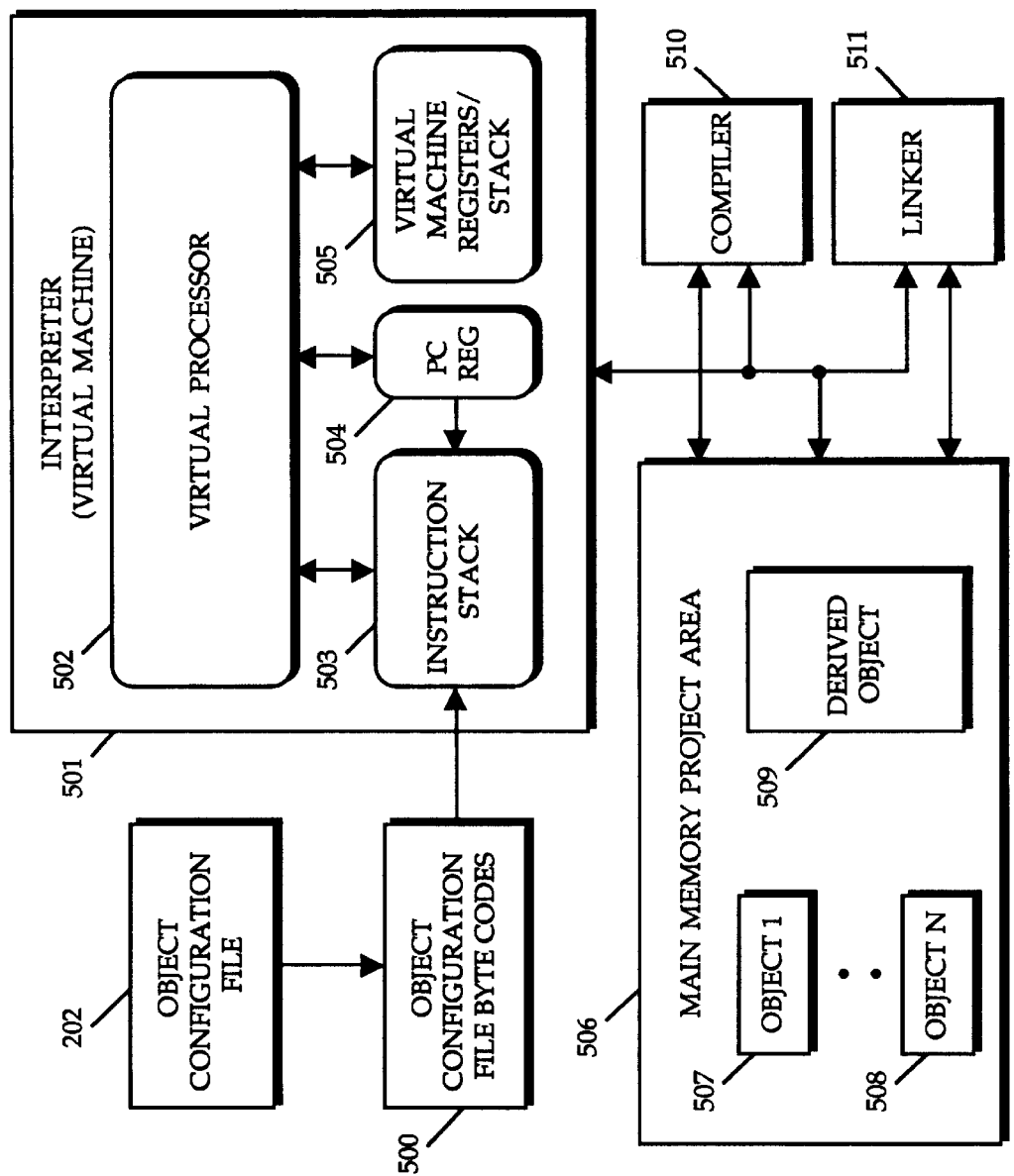
FIG. 5 is a block diagram of an interpreter-based virtual machine for system building.

Bytecodes in the virtual machine are analogous to microcode in a real machine. Microcode is the machine readable binary form of a microinstruction. Similarly, bytecodes are a binary form of the virtual machine instructions. In the JAVA™ instruction set, a bytecode comprises one opcode byte designating the operation to be performed, and zero or more succeeding bytes containing operands supplying parameters or data that will be used by the operation. Some instructions consist of only an opcode. Programs or object configuration files are written in the higher level language and compiled into bytecode format for execution by the interpreter. FIG. 5 is a block diagram of an interpreter-based virtual machine for system building.

In FIG. 5, object configuration file 202 is compiled into object configuration bytecodes 500 and placed in the instruction stack 503 of interpreter 501. Virtual processor 502, which consists of a software process supporting the bytecode instruction set, reads instructions from instruction stack 503 and operates on PC register 504 and virtual machine registers/stack 505 as set forth in the instruction. PC register 504 maintains the pointer or index to the next instruction to be executed. Virtual machine registers/stack 505 comprise virtual registers for storing variable values, and a stack (or heap) for stack operations. Bytecode instructions exist for pushing and popping the stack, loading register values to and from the top of the stack, and performing operations on the operands in the stack.

Compiler 510 and Linker 511 can be called by the interpreter to carry out compiling and linking operations on object files 507 and 508 in a project area within main memory 506, by specifying the object reference provided from the object configuration files 202 and 500. A reference to the resulting compiled or linked derived object (e.g., derived object 509 ) is returned to interpreter 501. Interpreter 501 also has access to the object files 507–508 and derived object 509 via object references. Interpreter 501 is therefore able to perform building operations on files 507–509.

Similar to a real machine, the inner loop of the virtual machine is essentially of the form:

```
do    {
      fetch an opcode byte;
      execute an action depending on the value of the opcode;
}     while (there is more to do);
```

This virtual machine cycle of this inner loop provides a central control point in the interpreting process. After processing of each input instruction, the interpreter returns to this central control point. In an embodiment of the invention, a commit decision is introduced at the central control point in the interpreter process to support transactional operation. The revised inner loop of the transactional interpreter-based virtual machine is of the form:

```
do      {
        if time to commit {
            commit transaction;
            begin new transaction;
        }
        fetch an opcode byte;
        execute an action depending on the value of the opcode;
}       while (there is more to do);
```

The "if" statement provides a controllable break point in the interpreter for ending one transaction, committing the transaction to memory, and beginning a new transaction. The granularity, i.e., the number of instructions per transaction, can be programmed into the "if" statement such that the interpreter commits, for instance, every ten instructions. Further, other mechanisms for determining an appropriate time to commit can be implemented. For example, the interpreter could be programmed to commit if a specified amount of time has elapsed since the last commit operation. Thus, the transactional nature of the interpreter can be implemented in an instruction-based format, a time-based format, or a combination format. A trigger can also be included to close a transaction when a particular type of instruction has just completed, e.g., an instruction entailing a relatively large number of changes to the virtual machine state.

To commit a transaction, the interpreter saves its current state information in some form of persistent storage, such as a database. The interpreter is designed to support durable storage of data. The transfer of the state to the database may comprise a complete transfer of all state information or a transfer of changes made since the last commit operation. Sufficient state information is stored such that the current state of the virtual machine can be restored. In one embodiment, the stored state information does not reflect the exact state of the virtual machine, but the state can be substantially derived from the stored state information.

One mechanism for providing persistent storage is to implement the interpreter in combination with an object-oriented database. For example, in an embodiment having a byte code interpreter as shown in FIG. 5, the PC register value, the virtual machine registers/stack values, etc., are stored during a commit cycle in an underlying database as database objects.

The machine state information varies with the details of the language used for the object configuration file, and whether or not the language is translated into bytecodes. One embodiment of the machine state for a bytecode interpreter comprises the "call stack," the bytecodes, and the "heap."

The set of active function calls and variables local to those functions are stored on a call stack, or activation stack. This stack is basically a persistent array of references to objects holding the actual state. Two registers hold the base and limit of the currently active stack frame, and these are also made persistent.

The bytecodes consist of the instructions to be executed. This is a collection of arrays of byte values, one array for each module (object configuration file). Object configuration files may refer to others, as in normal modular programming. The arrays of byte values can be made persistent, though it is not necessary to do so. However, the program counter, which is an index into the bytecode array, is part of the persistent machine state.

All other data is stored on a heap, which is a collection of persistent objects whose lifetime is determined by reachability rules defined by the configuration language.

The immutability properties on which the system build restartability is based apply equally to the object configuration file. Therefore, some elements of the machine state, e.g., the bytecode arrays, can be regenerated in transient storage from the immutable object configuration files on restart. The determination of whether to regenerate a portion of the machine state or to maintain the complete machine state in persistent storage is dependent on which is more critical to the system builder—time constraints or storage constraints.

Figure 6:
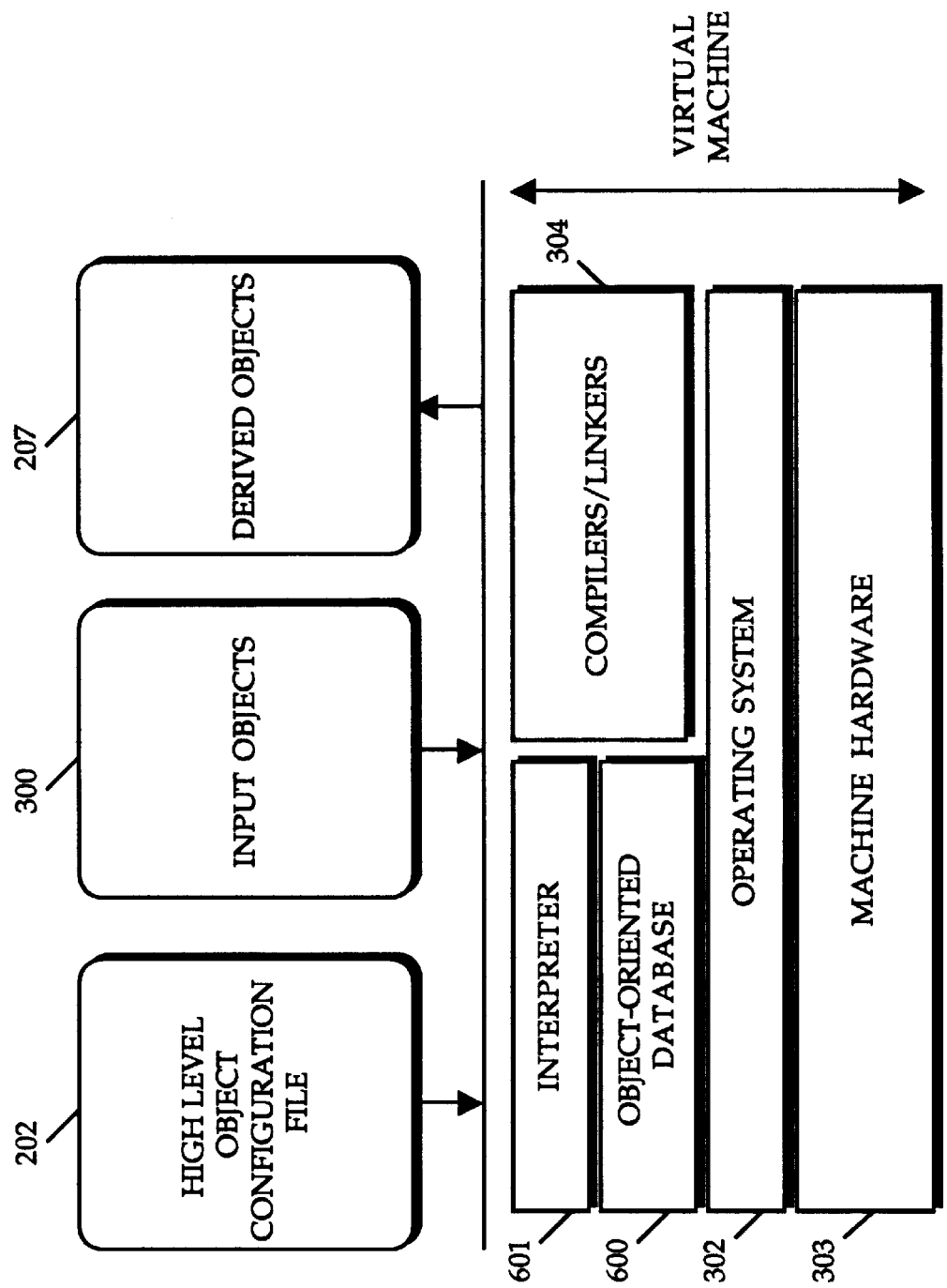
FIG. 6 is a block diagram of a computer system having an interpreter-based system builder and an underlying database.

FIG. 6 illustrates a computer system running a transactional interpreter with an underlying database according to one embodiment of the invention. In FIG. 6, object configuration file 202 and input objects 300 are shown as inputs to the virtual machine comprising elements 302–304 and 600–601. Derived objects 207 are the immutable derived objects generated by the virtual machine. Operating system 302 runs on top of the platform provided by machine hardware 303. Object-oriented database 600 and compilers/linkers 304 run in the environment provided by operating system 302.

Transactional interpreter 601 operates within the environment provided by operating system 302, with access to compilers/linkers 304, and with persistent object support from object-oriented database 600. At the end of each transaction, interpreter 601 updates the persistent state objects in database 600, and when restarting after an interruption, interpreter 601 refreshes the virtual machine state from the persistent state objects in database 600.

The derived objects 207 are effectively part of the state of the virtual machine computation, and are stored transactionally. In one embodiment, the derived objects are stored in the database with the other elements of the virtual machine state. This happens either in a separate process that accesses the database in a transaction, returning a reference to the interpreter, or as a subprocedure of the interpreter, i.e., in the same process.

Figure 7:
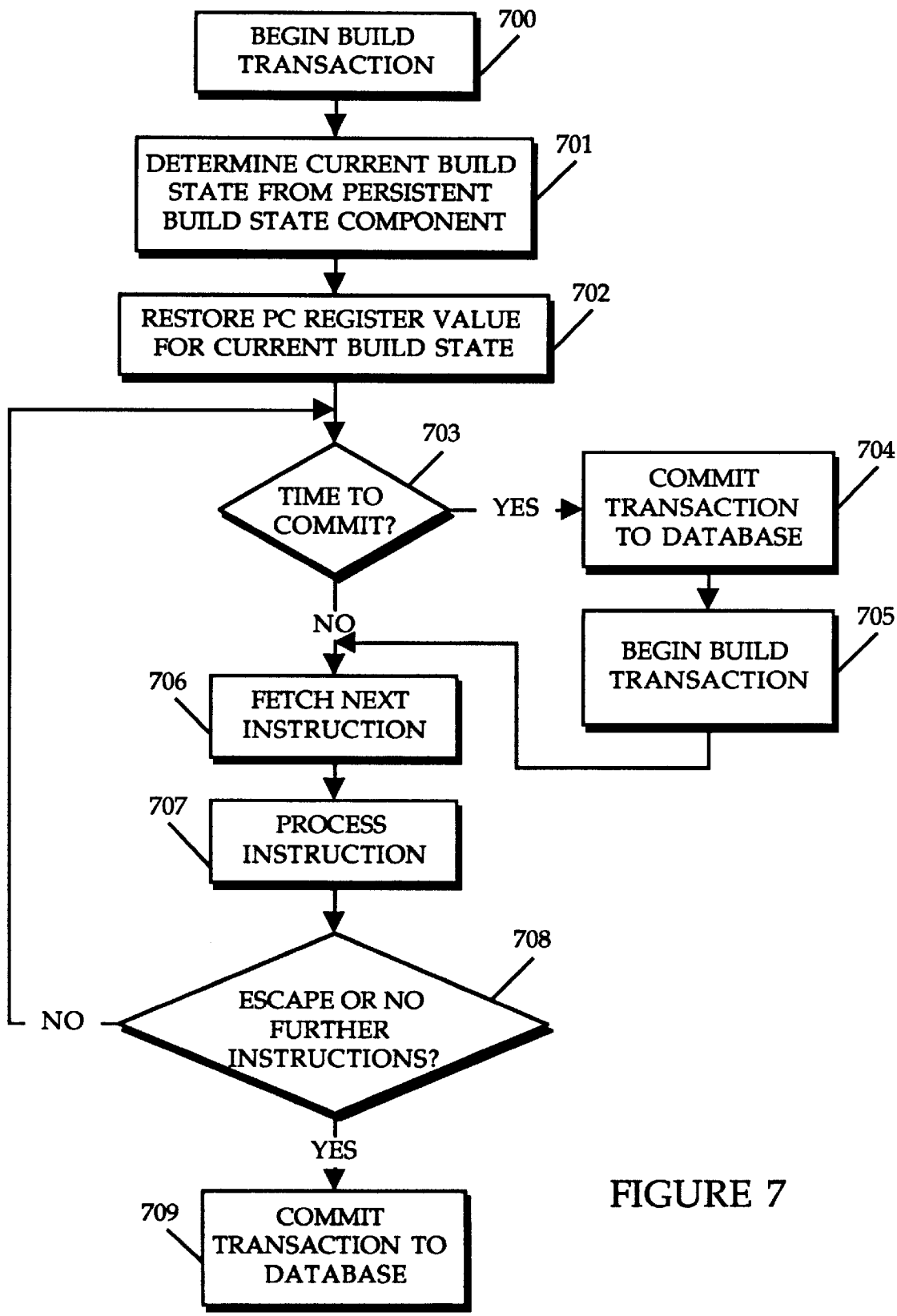
FIG. 7 is a flow diagram of the operation of a transactional interpreter according to an embodiment of the invention.

FIG. 7 is a flow diagram of the virtual machine cycle of a transactional interpreter according to one embodiment of the invention. When a system build begins, a transaction is initiated in step 700. In step 701, the virtual machine restores its state from the persistent build state component in the underlying database if a current build state component exists. In step 702, the next instruction, or opcode, to be executed is identified from the persistent PC register value. If no persistent PC register value exists, then the PC register value is assumed to be zero, i.e., the beginning of a system build.

Steps 703–708 comprise the fetch and execute cycle of the interpreter. In step 703, a commit determination is made. If it is time to commit, e.g., if a preset number of instructions or opcodes have been executed since the last commit operation, then in block 704, the transaction is committed to the database by writing to the persistent build state component in the database. A new transaction begins in subsequent step 705 before proceeding to step 706. If, in step 703, it is not time to commit, the process proceeds directly to step 706. In step 706, the next instruction is fetched from the instruction stack referenced by the PC register value, and in step 707, the instruction is executed.

In step 708, a branching occurs based on whether all instructions have been executed, i.e., the build is done. If there are still instructions to execute, the process returns to step 703. If the build process is done, then in step 709, the final transaction is committed to the database. Step 708 can also provide for an escape from the process. i.e., an instruction may be processed which calls for the build process to be temporarily halted while other operations are performed, such as an external compile operation. In this case, the transaction would be committed in step 709 to permit the build to resume from the current position when restarted.

By implementing a transactional interpreter, system building and other extensive interpretive activities are able to be suspended and restarted without significant loss of progress. If the computer system crashes, the user interrupts the activity, or any other form of disruption occurs, the interpreter can resume operation from the last completed transaction. It will be obvious to those skilled in the art that transactional interpreters can be utilized in other than system building environments as well.

Thus, a method and apparatus for system building with a transactional interpreter has been described in conjunction with one or more specific embodiments. The invention is defined by the claims and their full scope of equivalents.

I claim:

1. A method for performing interpreter-based operations comprising:

executing an interpreter process within a computer system to form a virtual machine having a machine state;

interpreting a set of input instructions; and committing said machine state at the end of a transaction.

2. The method of claim 1 wherein committing said machine state comprises:

storing state information about a current machine state in persistent storage.

3. The method of claim 2 wherein storing comprises:

writing said state information to an object oriented database.

4. The method of claim 2 further comprising:

restarting an interrupted operation by restoring said machine state from said state information.

5. The method of claim 1 wherein interpreting comprises:

fetching a first instruction from said set of input instructions;

processing said first instruction; and determining if a transaction has completed.

6. The method of claim 5 wherein determining if a transaction has completed comprises:

determining whether a predetermined number of instructions have been processed since completion of a previous transaction.

7. The method of claim 5 wherein determining if a transaction has completed comprises:

determining whether a predetermined time interval has passed since completion of a previous transaction.

8. The method of claim 1 further comprising:

generating derived objects from a set of input objects.

9. A computer program product comprising:

a computer usable medium having computer readable program code embodied therein for performing interpreter-based operations in a computer system, said computer program product comprising:

computer readable program code configured to cause a computer to execute an interpreter process to form a virtual machine having a machine state;

computer readable program code configured to cause a computer to interpret a set of input instructions; and computer readable program code configured to cause a computer to commit said machine state at the end of a transaction.

10. The computer program product of claim 9 wherein said computer readable program code configured to cause a computer to commit said machine state at the end of a transaction comprises:

computer readable program code configured to cause a computer to store state information about a current machine state in persistent storage.

11. The computer program product of claim 10 wherein said computer readable program code configured to cause a computer to store state information about a current machine state in persistent storage comprises:

computer readable program code configured to cause a computer to write said state information to an object-oriented database.

12. The computer program product of claim 10 further comprising:

computer readable program code configured to cause a computer to restart an interrupted operation by restoring said machine state from said state information.

13. The computer program product of claim 9 wherein said computer readable program code configured to cause a computer to interpret a set of input instructions comprises:

computer readable program code configured to cause a computer to fetch a first instruction from said set of input instructions;

computer readable program code configured to cause a computer to process said first instruction; and computer readable program code configured to cause a computer to determine if a transaction has completed.

14. The computer program product of claim 13 wherein said computer readable program code configured to cause a computer to determine if a transaction has completed comprises:

computer readable program code configured to cause a computer to determine whether a predetermined number of instructions have been processed since completion of a previous transaction.

15. The computer program product of claim 13 wherein said computer readable program code configured to cause a computer to determine if a transaction has completed comprises:

computer readable program code configured to cause a computer to determine whether a predetermined time interval has passed since completion of a previous transaction.

16. The computer program product of claim 9 further comprising:

computer readable program code configured to cause a computer to generate derived objects from a set of input objects.

17. Apparatus for performing interpreter-based operations in a computer system, comprising:

a processor; and a transactional interpreter process executed by said processor to form a virtual machine having a machine state, said transactional interpreter process configured to commit said machine state at the end of a transaction.

18. The apparatus of claim 17 further comprising:

persistent storage containing state information about said machine state from a previous completed transaction.

19. The apparatus of claim 18 wherein said persistent storage comprises:

an object-oriented database.

20. The apparatus of claim 18 wherein said transactional interpreter process comprises:

computer executable code configured to cause a computer to restore said machine state from said state information in said persistent storage upon restart of an interrupted operation.

21. The apparatus of claim 17 further comprising:

a set of input objects stored in a memory; and a set of input instructions containing steps for generating derived objects from said set of input objects.

22. The apparatus of claim 17 wherein said transactional interpreter process comprises:

computer executable code configured to cause said computer to determine when a transaction has completed.

23. The apparatus of claim 22 wherein said computer executable code is dependent on a predetermined number of instructions processed since a previous transaction.

24. The apparatus of claim 22 wherein said computer executable code is dependent on a passing of a predetermined time interval since a previous transaction.

25. A method for performing interpreter-based operations comprising:

executing an interpreter process within a computer system to form a virtual machine having a machine state;

interpreting a set of input instructions; and committing said machine state at the end of a transaction by storing state information about a current machine state in a persistent storage comprising an object oriented database.

26. A method for performing interpreter-based operations comprising:

executing an interpreter process within a computer system to form a virtual machine having a machine state;

interpreting a set of input instructions;

generating derived objects from a set of input objects; and committing said machine state at the end of a transaction.

27. A computer program product comprising:

a computer usable medium having computer readable program code embodied therein for performing interpreter-based operations in a computer system, said computer program product comprising:

computer readable program code configured to cause a computer to execute an interpreter process to form a virtual machine having a machine state;

computer readable program code configured to cause a computer to interpret a set of input instructions; and computer readable program code configured to cause a computer to commit said machine state at the end of a transaction by storing state information about a current machine state in a persistent storage comprising an object-oriented database.

28. A computer program product comprising:

a computer usable medium having computer readable program code embodied therein for performing interpreter-based operations in a computer system, said computer program product comprising:

computer readable program code configured to cause a computer to execute an interpreter process to form a virtual machine having a machine state;

computer readable program code configured to cause a computer to interpret a set of input instructions;

computer readable program code configured to cause a computer to generate derived objects from a set of input objects; and computer readable program code configured to cause a computer to commit said machine state at the end of a transaction.

29. Apparatus for performing interpreter-based operations in a computer system, comprising:

a processor; and a transactional interpreter process executed by said processor to form a virtual machine having a machine state;

persistent storage comprising state information about said machine state from a previous completed transaction, said persistent storage comprising an object-oriented database.

30. Apparatus for performing interpreter-based operations in a computer system, comprising:

a processor;

a transactional interpreter process executed by said processor to form a virtual machine having a machine state;

a set of input objects stored in a memory; and a set of input instructions configured to generate derived objects from said set of input objects.

* * * * *